Figure 1:
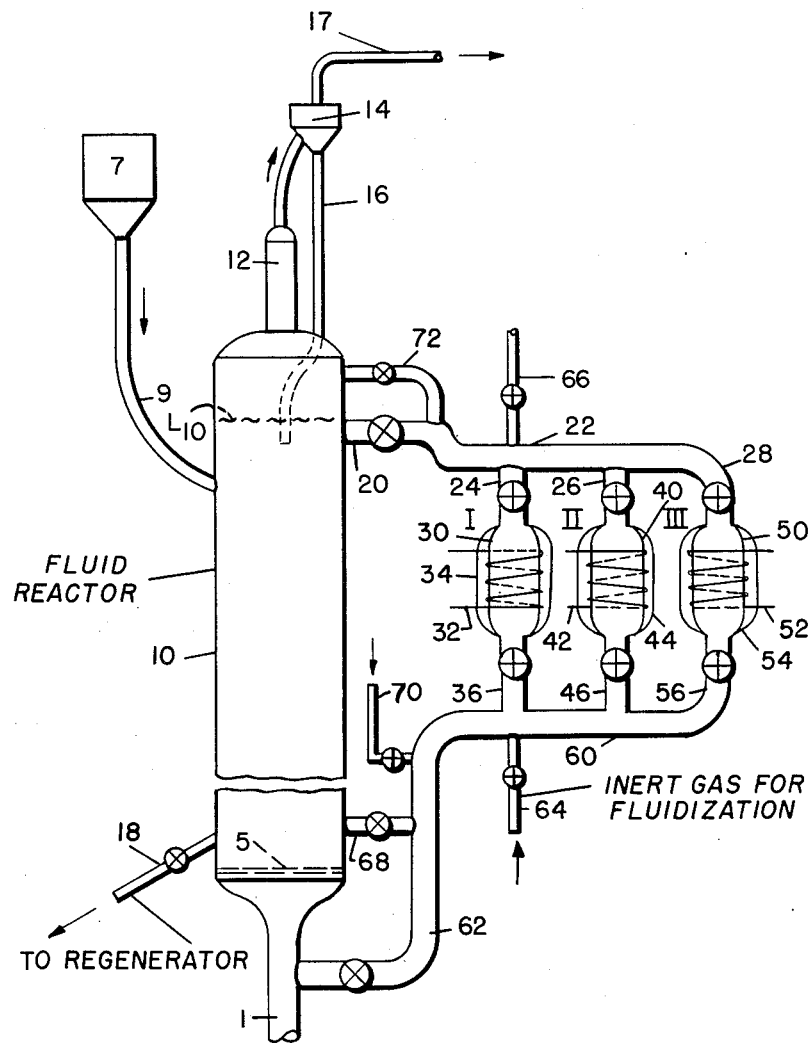

Oct. 2, 1956     I. KIRSHENBAUM     2,765,330

MAGNETIC CONTROL OF CHEMICAL REACTIONS

Filed July 30, 1952     4 Sheets-Sheet 1

FIG.—1

ISIDOR KIRSHENBAUM     INVENTOR

Oct. 2, 1956     I. KIRSHENBAUM     2,765,330
MAGNETIC CONTROL OF CHEMICAL REACTIONS
Filed July 30, 1952                                    4 Sheets-Sheet 2

ISIDOR KIRSHENBAUM    INVENTOR

United States Patent Office 2,765,330
Patented Oct. 2, 1956

2,765,330

MAGNETIC CONTROL OF CHEMICAL REACTIONS

Isidor Kirshenbaum, Union, N. J., assignor to Esso Research and Engineering Company, a corporation of Delaware Application July 30, 1952, Serial No. 301,695

15 Claims. (Cl. 260—449.6)

The present invention relates to an improved method of controlling chemical reactions and, more particularly, to a control method utilizing the magnetic properties of materials involved in a reaction, the conditions of which it is desired to control.

There are many chemical reactions involving ferro- or paramagnetic materials wherein the magnetic materials undergo changes in chemical composition and wherein the reaction conditions must be controlled as a function of such changes. Outstanding examples are metallurgical or other reduction processes for the reduction of the oxides of iron, nickel, cobalt, chromium, manganese, etc., oxidation processes involving the production of various oxygen compounds of the same type of metals, for example in the manufacture of pigments, catalysts, etc.; and many catalytic reactions involving the use of various ferro- or paramagnetic materials, such as iron, cobalt, nickel, chromium, their oxides and sulfides, or mixtures of these materials as catalysts in hydrogenation, dehydrogenation or related conversions of organic and inorganic materials. The control of the reaction conditions, as a function of chemical changes of the magnetic materials and determinations of the extent of the reaction, have heretofore been accomplished mainly by methods based on sampling and chemical analysis. These methods are time-consuming and not readily adaptable to automatic means of process control or surveillance.

The present invention is chiefly concerned with an improved method for measuring and controlling the extent and conditions of reactions of the type specified above, and it is one of the principal objects of the invention to provide means which may be readily employed in a manner affording continuous and automatic process control and surveillance.

The present invention makes use of changes of the magnetic properties, which ferro- and paramagnetic materials undergo in the course of chemical reactions, to determine and/or control the extent and conditions of such reactions. More particularly, the invention utilizes the changes of the magnetic susceptibility of ferro- or paramagnetic materials (i. e. their reaction to a magnetic field), resulting from chemical and/or temperature changes of these materials, for the desired process control and surveillance.

In accordance with the preferred embodiment of the invention, these changes in the magnetic susceptibility of the materials involved are followed by their influence on the inductance of an electro-magnetic field such as that produced by a wire coil connected to a magnetizing electric circuit, and the inductance of the coil is measured by suitable conventional methods such as the radiofrequency method [1], a ballistic galvanometer [2], or the like. The extent of the chemical reaction is then followed by the change in inductance of the coil.

[1] Gorter, Physica v. 3: 503, 998, 1006 (1936); v. 4: 579, 667 (1937).
[2] Becker & Doring, "Ferromagnetismus," p. 10 (1939); Klemm "Magnetochemie," p. 32, 34 (1936), both lithoprinted by Edwards Inc., Ann Arbor, Mich.

This change in inductance may be readily recorded or use to operate automatic means of process control. The scope and general nature of the invention will be best understood from the typical examples for its utility given below.

Example 1

The iron oxide, $\alpha$-$Fe_2O_3$ (Red Iron Oxide) is paramagnetic and when subjected to the magnetic field of a coil will therefore change the inductance of the coil very little. However, when this material is reduced to ferromagnetic $Fe_3O_4$ a change in inductance is observed. This change will continue until an inductance maximum is obtained when all of the $\alpha$-$Fe_2O_3$ is converted to $Fe_3O_4$. A further reduction to iron will result in a still greater increase in inductance. This second change may be amplified by carrying out this reduction above about 1094° F., which is the Curie point of $Fe_3O_4$. The change in inductance of the coil may be recorded and may at the same time be used to control the temperature of the reduction and/or flow of the reducing gas.

Example 2

The composition of an iron catalyst employed in any moving form may be determined very quickly by by-passing small amounts of catalyst through coil-wound tubes at various temperatures. Thus, if the catalyst contains Fe, $Fe_3O_4$ and iron carbides, it may be by-passed through three tubes as follows:

1. Tube 1 at room temperature or any temperature below about 400° F.
2. Tube 2 at about 550° F. or any temperature below about 1094° F.
3. Tube 3 at about 1100° F. or any temperature above 1100° F. but below about 1416° F.

The change in inductance of the coil around tube 1 is a function of the ferromagnetism of the iron carbides, $Fe_3O_4$ and Fe; that of the coil around tube 2 is due to the ferromagnetism of $Fe_3O_4$ and Fe only, since 550° F. lies above the Curie point of $Fe_3C$ of about 419° F., and of $Fe_2C$ of about 500° F. at which temperature the ferromagnetism of the respective carbides disappears; the change in inductance of the coil around tube 3 is due solely to the ferromagnetism of Fe since the Curie point of $Fe_3O_4$ is about 1094° F. By empirical calibration curves or by theoretical calculation, equations may be set up correlating these changes in inductance with the weight percent of each ferromagnetic compound in the mixture. The changes may also be used for direct process control as indicated in Example 1.

Example 3

The Curie point of $Fe_3O_4$ is about 1094° F. whereas that of Fe is 1416° F. Reduction of $Fe_3O_4$ at 1100° or 1200° F. will therefore, show up magnetically as a change from a paramagnetic substance to a ferromagnetic substance. This fact may be utilized in accordance with the invention for an exact control of the extent of the reduction reaction by observing the progress of the reduction reaction in the form of the corresponding coil inductance change and carrying on the reduction reaction to a given inductance reading.

Example 4

In the reduction of $Fe_2O_3$ to $Fe_3O_4$ at temperatures in the neighborhood of, but below about 1094° F., the Curie point of $Fe_3O_4$, runaway temperatures can be controlled by magnetic measurements. A runaway temperature will raise that temperature of the catalyst above 1094° F. and will, therefore, be observed as a loss in ferromagnetism—a sudden shift in inductance. This sudden shift may be used to control the temperature, the flow rate of reducing gas, etc.

Similar methods of reaction control may be used with paramagnetic materials such as $Fe_2O_3$, $Cr_2O_3$, $MnO_2$, MnO, etc. However, a more sensitive apparatus than that used for the ferromagnetic materials is needed to detect changes in inductance in these cases.

Figure 2:
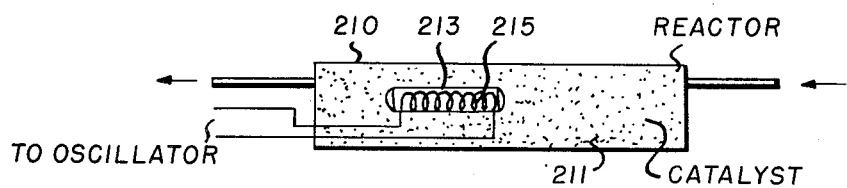
Figure 3:
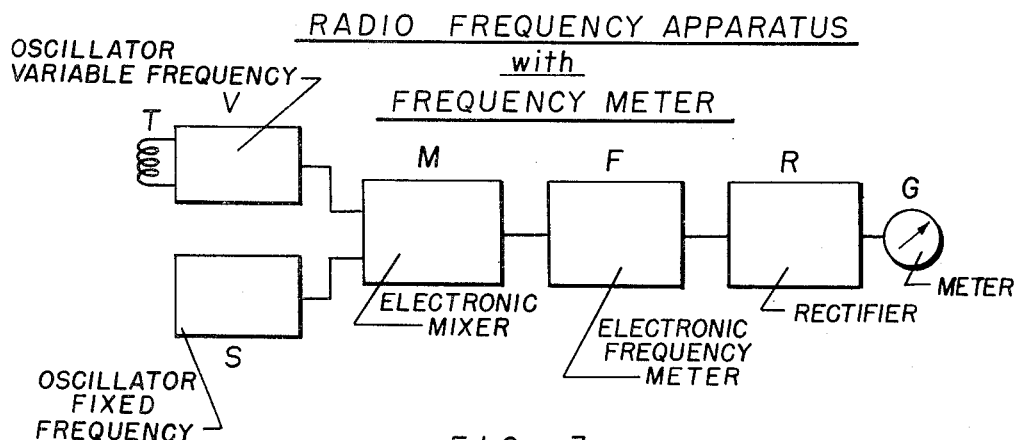

Having set forth its objects and general nature, the invention will be best understood from the more detailed description hereinafter wherein reference will be made to the accompanying drawing in which Fig. 1 illustrates schematically a system suitable for carrying out a preferred embodiment of the invention, Fig. 2 is a schematical illustration of a simplified system useful for similar purposes, Fig. 3 shows schematically one type of apparatus suitable for measuring, recording and/or applying to process control the magnetic effects produced in the systems of Figs. 1 and 2, and Figs. 4 to 6 are more detailed schematical illustrations of individual elements of the apparatus of Fig. 3.

Referring now to Fig. 1, the apparatus illustrated therein essentially comprises a conventional fluid catalyst reactor 10, and magnetic measuring tubes 30, 40 and 50, whose functions and cooperation will be forthwith explained using as an example the catalyst system

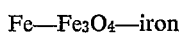

carbides as it prevails for instance in the catalytic synthesis of normally liquid hydrocarbons from CO and $H_2$ on iron-type catalysts. It should be understood, however, that the system of the drawing may be applied in a generally analogous manner to other reactions involving composites of materials having different magnetic properties.

In operation, gaseous reactants such as a synthesis gas mixture of hydrogen and carbon monoxide in the ratio of about 1–2 mols of $H_2$ to 1 mol of CO may be introduced into reactor 10 through line 1 to flow upwardly through a perforated member such as a distributing grid 5 which is inserted to assure proper distribution of the gases through reactor 10.

Within reactor 10 a mass of iron catalyst is maintained in the form of a powder having a particle size of about 200–400 mesh, preferably in such size distribution that 90–95% has a particle size of about 300 mesh. When starting up the process, this catalyst may be supplied to reactor 10 from catalyst feed hopper 7 through pipe 9. The linear velocity of the gases within reactor 10 is kept within the approximate range of 0.3–5 ft. per second, preferably within the range of 0.5–1.5 ft. per second, for the particle sizes indicated above. If, however, larger particle sizes, say, up to ¼ in. are used, the linear gas velocity may be as high as 5–10 ft. per second.

At the conditions of particle size and gas flow indicated the catalyst takes on the form of a dense, turbulent, ebullient mass resembling a boiling liquid having a well-defined upper level $L_{10}$ and an apparent density of about 30–150 lbs. per cu. ft. depending on the fluidization conditions. The fluidized mass extends from the grid plate 5 to level $L_{10}$ and the catalyst particles move in all conceivable directions through the fluidized mass. The amount of gas supplied through line 1 may be so controlled that about 20–50 normal cu. ft. of fresh synthesis gas enters reactor 10 per lb. of iron catalyst per hour. The pressure within reactor 10 may be kept within the approximate limits of 100 to 1500 lbs. per sq. in. The reaction temperature of the highly exothermic synthesis reaction may be controlled with the aid of any conventional cooling means (not shown) at a level falling between about 500° and 750° F. As a result of the ideal heat distribution and heat transfer characteristics of the fluidized catalyst mass, the temperature may be kept uniform over the entire length and diameter of the catalyst mass within a few degrees F.

Catalyst of undesirable composition may be withdrawn continuously or intermittently through pipe 18 to be regenerated and returned to reactor 10 in any manner known per se. Relationships between catalyst activity and the composition of an iron-type synthesis catalyst in terms of the content of metal, metal oxides and metal carbides are well known in the art. They are discussed in some detail, for example, in U. S. Patents No. 2,497,964 to Sumerford, 2,515,245 to Mattox and 2,530,998 to Scharmann and in Report No. 248–45 of U. S. Naval Technical Mission, May 24, 1946, together with specific recommended means for treating or reactivating such catalysts to maintain a satisfactory level of activity. The specific method of catalyst treatment which may be used in this way is not part of the present invention, which may be applied to any such method of treatment by determining magnetically the relative amounts of metal, oxides and carbides and operating the withdrawal, regeneration and replacement of catalyst on the basis of changes in the chemical composition thus determined.

Volatile reaction products containing entrained catalyst fines are withdrawn through line 12 and passed through a gas solids separator such as cyclone or filter 14 from which separated catalyst may be returned through line 16 to reactor 10. Product vapors and gases substantially free of entrained solids are withdrawn from separator 14 through line 17 and passed to a conventional product recovery system (not shown).

Conventional iron type synthesis catalysts originally consist of reduced iron oxide composites derived from pyrite ashes, magnetites, hematites, synthetic oxides, etc. and promoted with about 0.1–5% of an alkali metal promoter such as a chloride, fluoride, carbonate or oxide of sodium or potassium. A typical freshly-reduced catalyst may have an analysis about as follows:

| | Percent by weight |
|---|---|
| Fe | 97.0 |
| $O_2$ combined with Fe | 2.07 |
| $K_2O$ | 0.93 |

In the course of the synthesis reaction, the catalyst is oxidized and carbided to form increasing proportions of $Fe_3O_4$ and iron carbides which, in low concentrations are beneficial to the synthesis reactions but, when allowed to accumulate, give cause to catalyst deactivation, catalyst disintegration and undesirable shifts in product distribution toward oxygenated and high molecular weight constituents. To a certain extent this change in catalyst composition is a function of the reaction conditions such as temperature and feed gas composition and may be influenced by a proper control of these conditions. It is desirable, therefore, to maintain the concentration of $Fe_3O_4$ and iron carbides in the catalyst mass at a level suitable for optimum formation of the desired products. This may be accomplished either by controlling reaction conditions or by continuous or intermittent regeneration of the catalyst, or by suitable combinations of these methods. In order to obtain best results, however, it will be necessary continuously or intermittently to determine the exact composition of the catalyst within reactor 10 and to tie the degree of catalyst regeneration and/or adjustment of synthesis conditions to the rate of the change in catalyst composition. For this purpose the invention provides a testing and control system as will be described hereinafter.

Catalyst of average composition and particle size may be withdrawn continuously or at any desired interval from reactor 10 through overflow pipe 20 and passed to manifold 22 which is connected by valved pipes 24, 26 and 28, to measuring tubes 30, 40 and 50, respectively. These measuring tubes may be provided with coils 32, 42 and 52 of copper, silver, tungsten or other suitable metal wire, which are connected to suitable systems for measuring magnetic susceptibilities as will appear more clearly from the description of Figs. 3–6, given below.

Measuring tubes 30, 40 and 50 are also provided with suitable temperature control means such as heating jackets 34, 44 and 54, respectively. The walls of tubes 30, 40 and 50 must be of non-ferromagnetic material, such as KA2 steel (steel alloy containing $Cr$ and $Ni$) or other suitable heat resisting alloy. The walls of heating jackets 34, 44 and 54 may be of similar material or of ferromagnetic material, as desired. However, if ferromagnetic heating jackets are used the distance from coils 32, 42 and 52 to jackets 34, 44 and 54, respectively, must be of such magnitude when compared to the diameters of coils 32, 42, and 52, respectively, as to permit sufficiently accurate measurement and control. For example this distance may be equal to, or greater than, the diameter of the coil. Tubes 30, 40 and 50 discharge through valved pipes 36, 46 and 56 into manifold 60 which carries catalyst through line 62 to gas feed pipe 1 and back to reactor 10.

In making measurements, tubes 30, 40 and 50 are filled with catalyst by suitable manipulation of the valves in lines 24, 26, 28, 36, 46 and 56 in such a manner as will prevent undesired fluctuation in measurements. For example, tubes 30, 40 and 50 may be filled completely or to a definite upper mark, while maintaining a substantially constant bulk density. As soon as the catalyst in these tubes has attained tube temperature, the inductance of coils 32, 42 and 52 is measured by the equipment illustrated in Figs. 3–6 and the reaction conditions may be adjusted by hand or automatically, in accordance with the results obtained. In the case of the specific example here involved, tubes 30, 40 and 50 may be operated as outlined in Example 2 above for tubes 1, 2 and 3, respectively, in order to determine the amounts of Fe, $Fe_3O_4$ and iron carbides contained in the catalyst and accordingly to adjust the reaction conditions within reactor 10 and/or the rate of catalyst regeneration. When the measurement is completed the valves in lines 36, 46 and 56 are opened to permit the return of catalyst through lines 60 and 62 to gas feed line 1 wherein it is suspended in the feed gas and returned through grid 5 to reactor 10. Any inert fluidizing gas such as product gas, steam, nitrogen, etc. may be admitted through line 64 in small amounts to facilitate the flow of catalyst through tubes 30, 40 and 50 and lines 60 and 62. Excess fluidizing gas may be withdrawn through line 66.

It will be understood that tubes 30, 40 and 50 may be readily operated in a continuous manner by providing for proper fluidization through pipes 64 and 66 and manipulating the valves in lines 24, 26, 28, 36, 46 and 56 in such a manner as will permit the maintenance of a substantially constant catalyst concentration in tubes 30, 40 and 50.

Instead of passing the catalyst substantially in downward flow through tubes 30, 40 and 50 as explained above, any suitable upflow arrangement may be employed. For example, catalyst may be withdrawn from a lower portion of reactor 10 through line 68 under the pseudo-hydrostatic pressure of the fluidized catalyst mass and passed into lines 62 and 60, aeration gas being supplied through lines 64 and 70. The fluidized catalyst when flows upwardly through tubes 30, 40 and 50 and returns through manifold 22 and line 72 to the top of reactor 10. This modification of the invention may, likewise, be employed in a continuous or intermittent manner as will be understood by those skilled in the art.

While three measuring tubes are shown in Fig. 1, the invention is not limited to this exact number. More or fewer tubes may be used depending on the composition and magnetic properties of the material to be tested and the process control desired. Coils 32, 42 and 52 may also be arranged within tubes 30, 40 and 50, respectively, as will be understood by those skilled in this art. In the latter case, the walls of tubes 30, 40 and 50 may be of ferromagnetic material if the distance between the coils and the tube walls is sufficiently great to allow accurate determination or control, as outlined above. Other modifications of the apparatus of Fig. 1 will occur to the experts without deviating from the spirit of invention.

Another embodiment of the invention which is suitable for magnetic measurements in situ and thus adaptable to operations involving the use of fixed beds of magnetic materials is illustrated in Fig. 2.

Referring now to Fig. 2, the numeral 210, represents a catalytic or any other type of reactor containing a fixed bed of ferro- or paramagnetic catalyst or other solids 211 undergoing a change of magnetic properties in the course of a reaction carried out in reactor 210. A capsule 213 of non-magnetic material is imbedded in the solids mass 211 and contains a wire coil 215 connected to the measuring system of Figs. 3–6 as will appear hereinafter. If the walls of reactor 210 are made of ferro-magnetic material the diameter of coil 215 should be made sufficiently small so that the distance from the coil winding to the wall of reactor 210 allows accurate measurements and control. This may be accomplished, for example, by making this distance about equal to, or great than, the coil diameter, as indicated above. In order to prevent solids from entering coil 215 as a result of gas flow or the like, which would cause irregularities in the inductance changes of coil 215, capsule 213 is preferably sealed against reactor 210 and solids mass 211. When the magnetic properties of mass 211 change, as a result of the reaction carried out in reactor 210, the inductance of coil 215 changes accordingly and these changes in inductance may be measured and followed by systems of the type illustrated in Figs. 3–6. The reaction conditions in reactor 210 may then be adjusted accordingly in a manner similar to that indicated in connection with Fig. 1. It will be appreciated that the system of Fig. 2 may be employed in substantially the same manner as just described, to moving or fluidized beds of ferro- or paramagnetic solids.

A system suitable for measuring an recording the inductance changes occurring in coils 32, 42 and 52 of Fig. 1 and 215 of Fig. 2 is schematically illustrated in Figs. 3–6.

Figure 4:
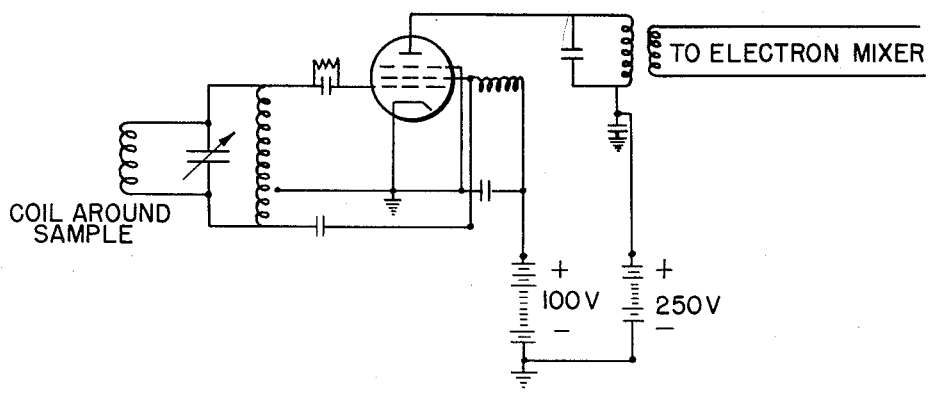

Referring to Fig. 3, the system shown therein essentially comprises a fixed frequency oscillator S, a variable frequency oscillator V, an electronic mixer M, an electronic frequency meter F, a rectifier R and a meter G. The letter T designates a coil of varying inductance and corresponds to coils 32, 42 and 52 of Fig. 1 and coil 215 of Fig. 2. Fig. 4 illustrates schematically a conventional embodiment of elements T and V of Fig. 3, while elements M and S are shown in greater detail in Fig. 5, and elements F, R and G in Fig. 6.

In operation, the frequency at which the oscillator V emits is principally determined by the value of the capacitance and inductance of the electrical circuit of which it forms a part. When the ferromagnetic materials act on coil T, inductance is changed and thus a shift in frequency is caused. This shift in frequency is measured by the frequency meter G.

When the variable oscillator V is generating a signal at the same frequency as the standard fixed frequency oscillator S, the meter G reads zero. Action of the magnetic material on the test coil T changes the frequency of the variable oscillator V. The difference in frequency between this signal and the standard signal from S is passed by the electronic mixer M into the electronic frequency meter F. The frequency difference is there converted into an electrical impulse which is rectified in R. The output of the rectifier is read on the D. C. meter. Thus the change in frequency resulting from the action of the magnetic material on the test coil is measured directly as an electric current which may be easily registered on a recorder. This frequency shift and the resultant electric current are both a function of the magnetic properties of the material tested and may be used for automatic process control in any suitable manner known per se. For example, for the system in Fig. 2, the output from rectifier R may be passed into a current relay which in turn actuates a gas valve controlling the flow of gas through the reactor.

Figure 5:
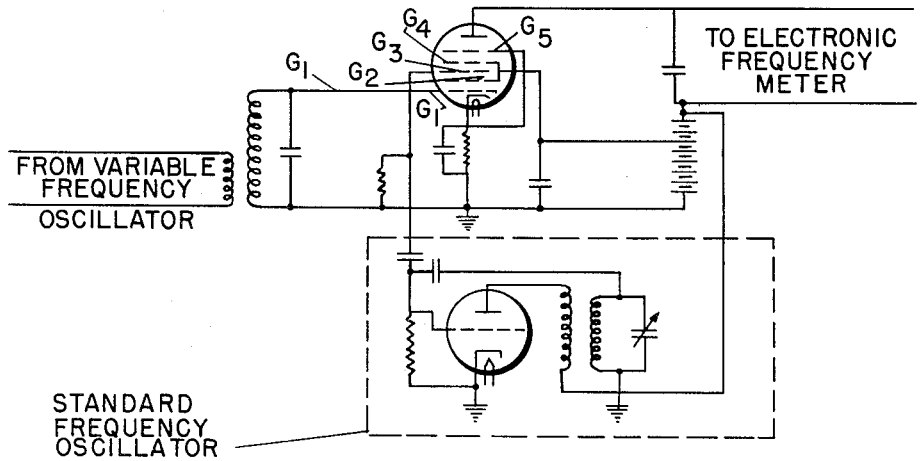
Figure 6:
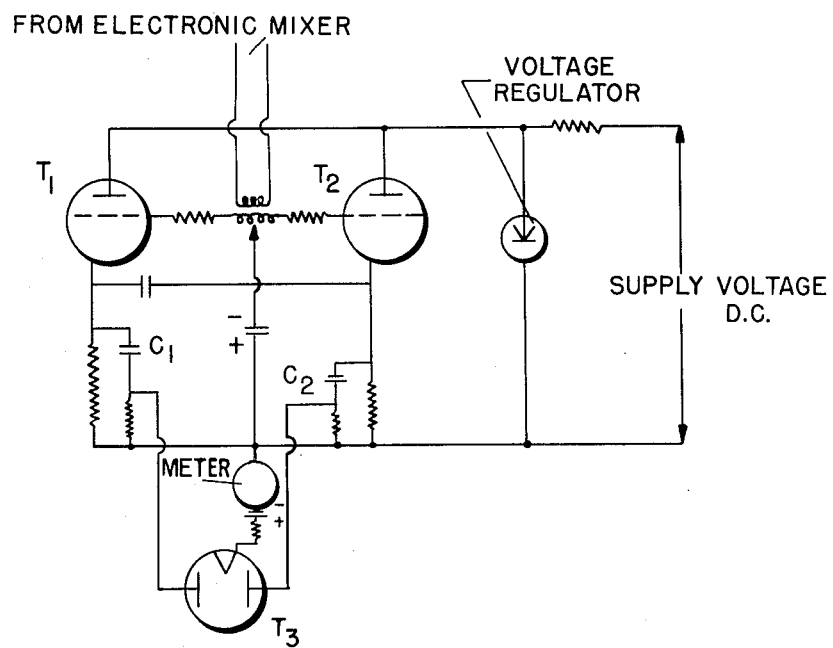

The elements illustrated in Figs. 4–6 are well known in the art and shown here merely to facilitate an understanding of the invention. A brief description of their operation will, therefore, be sufficient for the purposes of this specification.

Oscillators are essentially amplifiers with some means of feeding part of the output energy back into the grid circuit for the purpose of maintaining the electrical vibrations. These oscillations may be started by some sort of electrical disturbance such as the closing of a switch and the frequency of the oscillations is given by $$f = 1/(2\pi\sqrt{LC})$$

where L and C are, respectively, the inductance and capacitance of the circuit. The particular circuit shown in Fig. 4 is equivalent to an oscillator and power amplifier combined in one tube such as a vacuum-grid tube as described in Radio Engineer's Handbook, by F. E. Terman, McGraw-Hill Book Co., N. Y., 1943, pp. 480 et seq. This type of circuit has the advantage of giving a frequency practically independent of the load impedance receiving the output.

The electronic mixer shown in Fig. 5 is a typical pentagrid mixer [3] which may be used to receive the signal from the oscillator. In the special five grid tube, G–1 functions as an ordinary control grid to which the oscillator (Fig. 4) signal voltage is applied. The grids G–2 and G–4 are connected together and functions as a screen grid. Grid G–3 is biased negatively and has a voltage applied to it from the standard frequency oscillator. G–5 is an ordinary suppressor grid. In operation, G–1 controls the space current drawn from the cathode in accordance with the signal voltage and the standard oscillator acting on G–3 serves as a switch to allow these electrons to pass on to the anode or causes them to be returned to the screen region, depending upon whether the oscillator voltage is positive or negative. This is equivalent to modulating the oscillator voltage upon the signal frequency, resulting in a difference frequency current being developed in the anode circuit. This mixer tube has the significant advantage of giving very low interaction between the standard oscillator and the signal-frequency circuit, even at very high frequency.

This difference in frequency may be measured by a simplified electronic frequency meter similar to that shown in Fig. 6. In this instrument,[4] tubes T–1 and T–2 are gas triodes so connected that condensers C–1 and C–2 are alternately charged from the D. C. supply voltage, on the positive and negative halves of the input signal cycle from Fig. 5. The average or direct current flowing into either condenser is proportional to the number of charges per second and so to the frequency. A definite fraction of this charging current flows through the diode T–3 and the meter, which accordingly gives a deflection proportional to frequency. It is this current which may be lead to a relay for control purposes.

A radio frequency system has been described with reference to Figs. 3–6. It should be understood, however, that other systems suitable for measuring, recording and/or converting coil inductance changes into electrical impulses, such as a ballistic system, an inductance bridge system, a Q meter system, etc. may be used in an analogous manner.

It will also be appreciated that the present invention may be applied to the observation and control of reactions which as such do not involve the use of magnetic materials by subjecting extraneous magnetic materials to the influence of such reactions in a manner which will not interfere with the course of the reaction while permitting a change of the magnetic properties of these materials as a result of the reaction.

While the foregoing description and exemplary operations have served to illustrate specific applications and results of this invention, other modifications obvious to those skilled in the art are within the scope of this invention. Only such limitations should be imposed on the invention as are indicated in the appended claims.

This application is a continuation-in-part of the copending application Serial No. 767,621, filed August 8, 1947 for "Magnetic Control of Chemical Reactions" now abandoned.

What is claimed is:

1. The method of controlling a gas-solid reaction involving a composite solid material which contains an unknown amount of non-magnetic material and a plurality of magnetic constituents changing in the course of the reaction into other magnetic constituents having different chemical composition and different Curie points and wherein the amount of at least one of said constituents affects the course of the reaction, which comprises determining the amount of said constituent by heating different portions of said solid to temperatures below and above the Curie point temperature at which the magnetic properties of said constituent become extinguished on heating, measuring the change in the magnetic properties of said portions corresponding to the amount of said constituent and the respective presence and absence known of magnetic properties in said constituent at said temperatures, determining thereby the amount and changes in amount of said constituent present, withdrawing solid of undesirable composition from said reaction, regenerating said withdrawn solid to change its chemical composition, replacing said regenerated solid, and controlling the conditions of said reaction including the temperature and feed gas composition and the degree of solid regeneration at a rate determined by changes in the amount of said constituent present, thereby maintaining the concentration of said constituent in the solid at the desired level.

2. The method of claim 1 in which said magnetic properties include magnetic susceptibility and inductance, and said changes are measured by their influence on an electro-magnetic field.

3. The method according to claim 1 in which said composite material has the form of a body of finely divided solid particles maintained as a turbulent fluidized mass having substantially uniform composition throughout and said different portions of said material are withdrawn separately and continually from the main body of said fluidized mass, heated to said different temperature levels and subsequently returned to the main body of said fluidized mass.

4. The method of claim 3 in which said reaction is the catalytic synthesis of hydrocarbons from CO and $H_2$, and said solids comprise a catalyst containing iron, iron oxides and iron carbides.

5. The method of controlling the catalytic synthesis of hydrocarbons from CO and $H_2$ carried out in a reaction zone in the presence of a catalyst containing Fe, $Fe_3O_4$ and iron carbides of known magnetic properties in proportions varying as a function of variations in synthesis reaction conditions including temperature, feed gas composition and degree of catalyst regeneration, which comprises maintaining said catalyst in said reaction zone in the form of a dense, turbulent, fluidized mass of finely divided solids, withdrawing a portion of said catalyst from said reaction zone, dividing said withdrawn catalyst into three portions, passing said portions separately to three measuring zones in the form of readily flowing fluidized masses having each the same average composition and particle size as the catalyst in said reaction zone, maintaining a first one of said portions in its measuring zone at about room temperature and below 400° F., a second one of said portions in its ---
[3] See Terman, l. c., pp. 569 et seq.
[4] See Terman, l. c., pp. 958 et seq.

measuring zone at a temperature of about 550° F. and below 1094° F. and a third one of said portions in its measuring zone at a temperature of about 1100° F. and below 1416° F., measuring separately and continually the state of magnetization of all three portions in the three measuring zones, wherein the materials in said first zone exhibit magnetic properties corresponding to the total amount of Fe, Fe₃O₄ and iron carbides, the materials in said second zone exhibit magnetic properties corresponding to the total amount of Fe plus Fe₃O₄ excluding iron oxides and carbides whose known magnetic properties have been extinguished at 550° F., and the materials in said third zone exhibit magnetic properties responsive to the total amount of Fe excluding iron oxides and carbides whose known magnetic properties have been extinguished at 1100° F., determining electrically the differences between said measurements and the corresponding amounts of said magnetic components in said withdrawn catalyst, controlling said reaction conditions continually to maintain desired proportions of iron, iron oxides and carbides in the catalyst composition as thus determined, and returning said withdrawn catalyst from said measuring zones to said reaction zone.

6. The method of claim 5 in which said state of magnetization is measured by its influence on an electromagnetic field, changes in said field caused by said influence are converted into electrical impulses, and said impulses control said conditions.

7. The method of determining quantitatively the composition of a mixture constituents whose magnetic properties are known comprising of iron, oxides of iron, iron carbides and non-magnetic material, which comprises: (1) determining the magnetic properties of the mixture at approximately room temperature; (2) heating the mixture to a temperature of from about 550°–1100° F., which is above the Curie points of the iron carbides and measuring the magnetic properties of the mixture at the said temperature, thereby together with measurement (1) determining the amount of iron carbides in said mixture; (3) further heating the said mixture to a temperature of from about 1100°–1416° F., which temperature lies above the Curie point of magnetic iron oxide and below the Curie point of metallic iron, measuring the magnetic properties of the mixture in the last named temperature range, thereby determining directly the content of metallic iron and determining together with measurement (2) the content of magnetic iron oxide in the mixture.

8. A method for determining the amount of a known magnetic constituent in a composite material containing unknown amounts of other magnetic and non-magnetic constituents which comprises heating said material at two different temperatures respectively below and above the Curie point at which the known magnetic inductance of said constituent is extinguished, subjecting the material at each of said temperatures to the action of an electromagnetic field and measuring the difference between the total magnetic inductance of said material at said lower and higher temperatures as a proportional measure of the amount of said constituent.

9. A method for determining the amount of a known magnetic constituent in a composite material containing unknown amounts of other magnetic and non-magnetic constituents which comprises simultaneously heating two different portions of said material in an electro-magnetic field at different temperatures respectively below and above the Curie point at which the known magnetic inductance of said constituent is extinguished, and measuring the difference between the total magnetic inductance of said material at said lower and higher temperatures as a proportional measure of the amount of said constituent.

10. The method according to claim 9 in which said composite material has the form of a body of finely divided solid particles maintained as a turbulent fluidized mass having substantially uniform compositon throughout and said different portions of said material are withdrawn separately and continually from the main body of said fluidized mass, heated to said different temperature levels and subsequently returned to the main body of said fluidized mass.

11. A method for determining the amount of a known magnetic constituent in a composite material containing unknown amounts of other magnetic and non-magnetic costituents which comprises determining the magnetic inductance of said material at a temperature below the Curie point at which the known inductance of said constituent is extinguished, heating said material to the extinction of inductance of said constituent at a temperature above said Curie point and determining the inductance of said material at said higher temperature, and determining the difference between said inductance measurements as a proportional measure of the amount of said constituent.

12. The instantaneous method of determining the quantitative composition of a composite material containing an unknown amount of non-magnetic material and a plurality of ferromagnetic components having different Curie point temperatures which comprises simultaneously heating different portions of said material each to a different temperature level, separately measuring the magnetic properties of each of said portions and the corresponding changes between said magnetic properties at successive higher temperature levels, the lowest of said temperature levels being below all of said Curie points, measuring at said lowest temperature magnetic properties corresponding to the total amount of magnetic material and the total amount of non-magnetic material in said composite, the second and next highest of said temperature levels being above the Curie point of at least one of said magnetic components, measuring in the portion of said material at said second temperature level magnetic properties corresponding to the amount of said material maintaining its magnetic properties at said temperature plus non-magnetic materials including material whose known magnetic properties have been extinguished by exceeding said Curie point, measuring the differences between said magnetic properties at each of said different temperature levels as a proportional measurement of the amount of material whose Curie point has thus been exceeded at each of said successive higher temperatures, the highest of said temperature levels being below the Curie point of at least one of said components, and measuring thereby the portion of the magnetic properties of said material due to each of said components as a proportional measurement of the amount of each of said components.

13. The method according to claim 12 in which said composite material has the form of a body of finely divided solid particles maintained as a turbulent fluidized mass having substantially uniform composition throughout and said different portions of said material are withdrawn separately and continually from the main body of said fluidized mass, heated to said different temperature levels and subsequently returned to the main body of said fluidized mass.

14. The method of measuring, in the course of a catalytic reaction, the composition and changes in composition of a solid catalyst containing a plurality non-magnetic and of chemically related magnetic constituents changing into other of said related constituents having different Curie points in the course of said reaction, which comprises subjecting said solid catalyst to said reaction in a reaction zone, continually withdrawing separate portions of said catalyst from said reaction zone, heating each of said portions of withdrawn catalyst in a separate measuring zone to a different temperature level, said temperature levels being successively above the respective Curie points of different ones of said constituents but below the Curie point of at least one of said constituents, measuring magnetic properties of said separate portions of catalyst at said temperatures, measuring the changes in said magnetic properties between each of said higher temperature levels as a proportional measurement of the total amount of the respective constituent whose known magnetic properties have been extinguished by heating above its Curie point to said higher temperature, and at the highest of said temperatures measuring magnetic properties proportional to the amount of material whose known magnetic properties are still retained at said temperature, whereby changes in the amounts of the different magnetic constituents thus measured represent changes in the quantitative instantaneous composition of said catalyst in terms of said constituents, and returning said withdrawn catalyst to said reaction zone.

15. The method of claim 14 in which said reaction is the catalytic synthesis of hydrocarbons from CO and $H_2$, said catalyst comprises solid particles containing Fe, $Fe_3O_4$ and iron carbides, said withdrawn catalyst is divided into three portions, a first portion is heated to a temperature below 400° F. in a first measuring zone, a second portion is heated to a temperature above 400° F. but below 1094° F. in a second measuring zone, a third portion is heated to a temperature above 1100° F. but below 1416° F. in a third measuring zone, and the change in state of magnetization of the solids in all three measuring zones is measured separately.

References Cited in the file of this patent

UNITED STATES PATENTS

| | | |
|---|---|---|
| 1,188,430 | Fehr | June 27, 1916 |
| 1,321,347 | Wild et al. | Nov. 11, 1919 |
| 1,697,148 | Spooner | Jan. 1, 1929 |
| 1,952,185 | Smith | Mar. 27, 1934 |
| 2,235,835 | Goetzel | Mar. 25, 1941 |
| 2,360,787 | Murphree et al. | Oct. 17, 1944 |
| 2,405,137 | Gale et al. | Aug. 6, 1946 |
| 2,462,995 | Ritzmann | Mar. 1, 1949 |
| 2,489,066 | Wiig | Nov. 22, 1949 |
| 2,516,097 | Woodham et al. | July 18, 1950 |

OTHER REFERENCES

O. T. S. Report No. 284, Jan. 11, 1946 (pages 4–5). Authored by V. Haensel.

Hofer et al.: "Analytical Chemistry," vol. 22 (1950), pages 907 to 910.